US012574129B2

(12) United States Patent
Dimou et al.

(10) Patent No.: US 12,574,129 B2
(45) Date of Patent: Mar. 10, 2026

(54) INTERFERENCE MEASUREMENTS CONFIGURATION FOR ASSESSING IMPACT OF NETWORK ENTITY BACKOFF ADAPTATION RELAXATION

(71) Applicant: QUALCOMM Incorporated, San Diego, CA (US)

(72) Inventors: Konstantinos Dimou, New York, NY (US); Igor Gutman, Hod HaSharon (IL); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/454,570

(22) Filed: Aug. 23, 2023

(65) Prior Publication Data
US 2024/0072915 A1 Feb. 29, 2024

Related U.S. Application Data

(60) Provisional application No. 63/373,499, filed on Aug. 25, 2022.

(51) Int. Cl.
*H04B 17/336* (2015.01)
*H04W 74/0833* (2024.01)

(52) U.S. Cl.
CPC ........ *H04B 17/336* (2015.01); *H04W 74/085* (2013.01)

(58) Field of Classification Search
CPC .. H04B 17/336; H04B 17/318; H04B 17/345; H04W 74/085; H04W 72/27; H04W 72/541
See application file for complete search history.

(56) References Cited

U.S. PATENT DOCUMENTS

| | | | | | |
|---|---|---|---|---|---|
| 6,215,792 | B1 * | 4/2001 | Abi-Nassif | ......... | H04W 56/004 |
| | | | | | 370/461 |
| 10,708,851 | B2 * | 7/2020 | Karaki | ................ | H04W 72/569 |
| 12,160,820 | B2 * | 12/2024 | Dimou | ................ | H04W 52/386 |
| 2009/0186609 | A1 * | 7/2009 | Wu | ........................ | H04B 17/24 |
| | | | | | 455/424 |
| 2010/0099449 | A1 * | 4/2010 | Borran | ................ | H04W 52/243 |
| | | | | | 455/501 |

(Continued)

*Primary Examiner* — Ivan O Latorre

(74) *Attorney, Agent, or Firm* — ArentF ox Schiff, LLP

(57) ABSTRACT

Aspects are provided that allow a user equipment (UE) to facilitate interference measurements configuration for assessing impact of network entity backoff adaptation relaxation. The UE may obtain interference measurements of one or more first reference signals including a measurement prior to and after a backoff adaptation associated with a first network entity, and signal strength measurements of a second reference signal received from the first network entity. The UE also may send, to a second network entity of a serving cell, an interference report indicating whether downlink interference originates from the first network entity based at least in part on the interference measurements and the signal strength measurements. After obtaining the report, the second network entity may send, to the first network entity, a feedback signal indicating whether the first network entity is to modify the backoff adaptation based on the downlink interference to the UE.

30 Claims, 10 Drawing Sheets

700

710 — Obtain a plurality of interference measurements of one or more first reference signals including a measurement prior to and after a backoff adaptation associated with a first network entity 720 — Obtain one or more signal strength measurements of a second reference signal received from the first network entity 730 — Send, to a second network entity of a serving cell, an interference report indicating whether downlink interference originates from the first network entity based at least in part on the interference measurements and the one or more signal strength measurements

(56) References Cited

U.S. PATENT DOCUMENTS

| | | | | | |
|---|---|---|---|---|---|
| 2011/0081865 A1* | 4/2011 | Xiao | .......................... | H04L 1/06 | |
| | | | | | 455/63.1 |
| 2011/0194596 A1* | 8/2011 | Svedman | ................ | H04L 1/002 | |
| | | | | | 375/224 |
| 2013/0250796 A1* | 9/2013 | Frankkila | ............ | H04L 47/2416 | |
| | | | | | 370/252 |
| 2015/0133184 A1* | 5/2015 | Sadek | ............... | H04W 72/1215 | |
| | | | | | 455/552.1 |
| 2022/0124806 A1* | 4/2022 | Hu | ......................... | H04W 16/28 | |
| 2023/0077269 A1* | 3/2023 | Liu | ....................... | H04B 17/318 | |
| 2024/0049131 A1* | 2/2024 | Dimou | ............... | H04W 52/386 | |
| 2024/0072915 A1* | 2/2024 | Dimou | ................ | H04B 17/318 | |
| 2024/0411028 A1* | 12/2024 | Liang | ..................... | G01S 19/21 | |

* cited by examiner

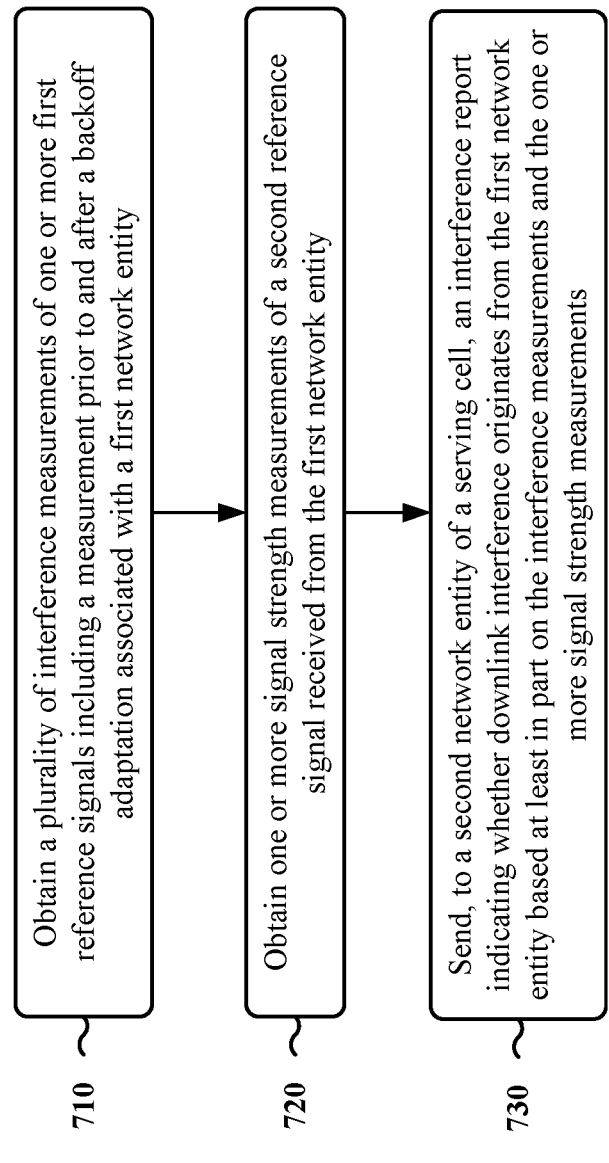

700

710  Obtain a plurality of interference measurements of one or more first reference signals including a measurement prior to and after a backoff adaptation associated with a first network entity 720  Obtain one or more signal strength measurements of a second reference signal received from the first network entity 730  Send, to a second network entity of a serving cell, an interference report indicating whether downlink interference originates from the first network entity based at least in part on the interference measurements and the one or more signal strength measurements

FIG. 7

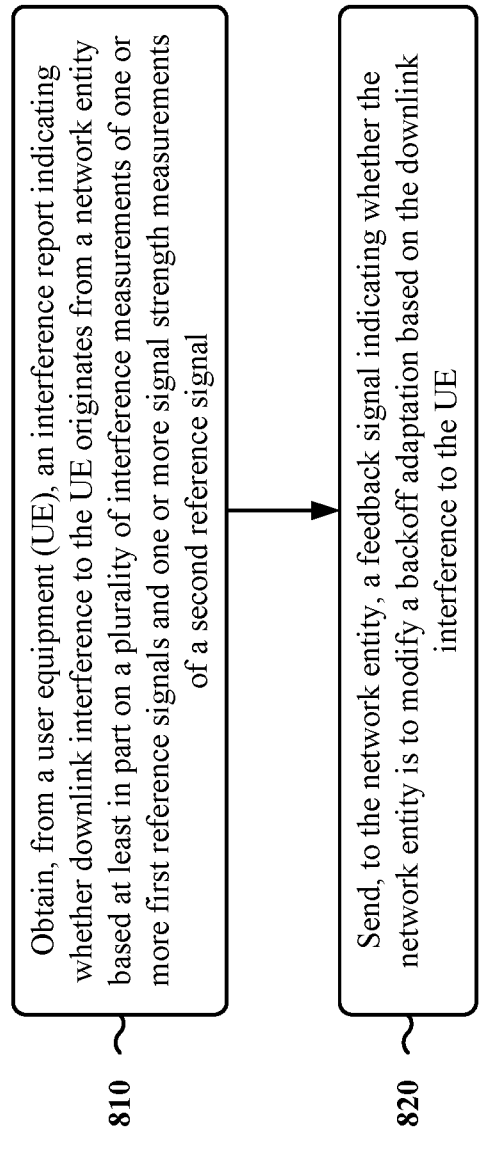

800

810 Obtain, from a user equipment (UE), an interference report indicating whether downlink interference to the UE originates from a network entity based at least in part on a plurality of interference measurements of one or more first reference signals and one or more signal strength measurements of a second reference signal 820 Send, to the network entity, a feedback signal indicating whether the network entity is to modify a backoff adaptation based on the downlink interference to the UE

FIG. 8

INTERFERENCE MEASUREMENTS CONFIGURATION FOR ASSESSING IMPACT OF NETWORK ENTITY BACKOFF ADAPTATION RELAXATION

CROSS-REFERENCE TO RELATED APPLICATION

This application claims the benefit of U.S. Provisional Application No. 63/373,499, filed on Aug. 25, 2022, which is hereby incorporated by reference in its entirety.

TECHNICAL FIELD

The present disclosure generally relates to communication systems, and more particularly, to interference measurements configuration for assessing impact of network entity backoff adaptation relaxation.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In 5G NR, the utilization efficiency of radiated power is carefully controlled. Wireless transmitters typically include a radio frequency (RF) power amplifier (PA) for amplifying the RF signal with sufficient power for wireless transmission to remote devices via one or more antennas. Each PA is typically a non-linear device with a limited linear dynamic range. The typical PA is more efficient when driven as close as possible to saturation. However, driving such a PA close to saturation causes the PA to operate outside its linear range, thus causing significant non-linear distortion.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE includes one or more memories; and one or more processors each communicatively coupled with at least one of the one or more memories, the one or more processors, individually or in any combination, operable to cause the UE to: obtain a plurality of interference measurements of one or more first reference signals, the plurality of interference measurements including a measurement obtained prior to and after a backoff adaptation associated with a first network entity; obtain one or more signal strength measurements of a second reference signal received from the first network entity; and send, to a second network entity of a serving cell, an interference report indicating whether downlink interference originates from the first network entity based at least in part on the plurality of interference measurements and the one or more signal strength measurements.

In another aspect of the disclosure, a method, a computer-readable medium, and an apparatus are provided. The apparatus may be a network entity. The network entity includes one or more memories; and one or more processors each communicatively coupled with at least one of the one or more memories, the one or more processors, individually or in any combination, operable to cause the network entity to: obtain, from a user equipment (UE), an interference report indicating whether downlink interference to the UE originates from a network entity based at least in part on a plurality of interference measurements of one or more first reference signals and one or more signal strength measurements of a second reference signal, the plurality of interference measurements including a measurement obtained prior to and after a backoff adaptation associated with the network entity, and the second reference signal being associated with the network entity; and send, to the network entity, a feedback signal indicating whether the network entity is to modify the backoff adaptation based on the downlink interference to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart of a method of wireless communication at a UE, according to some implementations of the present disclosure.

FIG. 8 is a flowchart of a method of wireless communication at a network entity, according to some implementations of the present disclosure.

DETAILED DESCRIPTION

Figure 1:
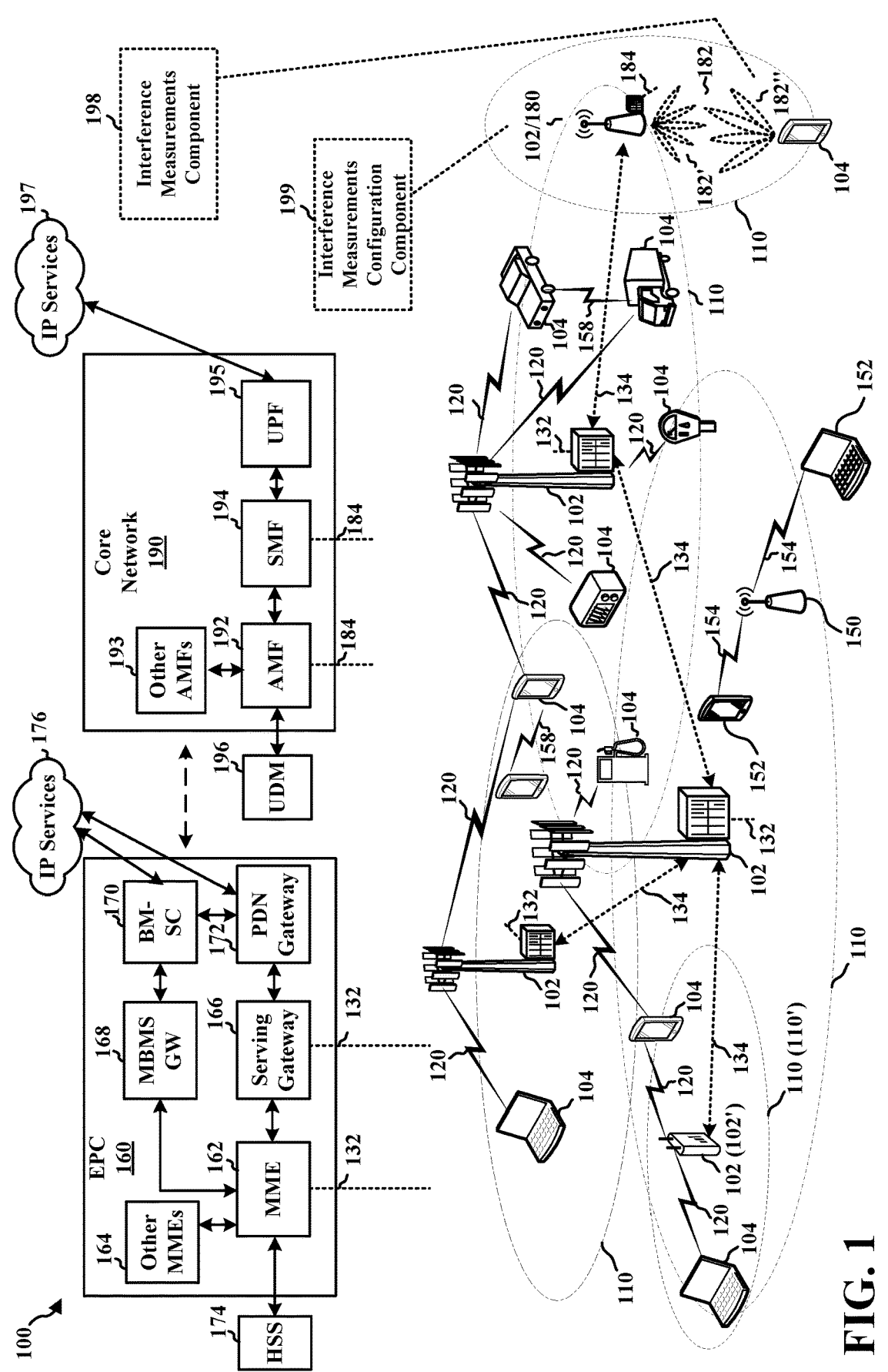
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The utilization efficiency of an influential resource, such as radiated power, plays a significant role in wireless system design. The power amplifier of a radio frequency (RF) transmitter is a major consumer of power and the source of all radiated power, and so power control protocols are used to minimize radiated power between nodes in wireless communication systems. Many high-power RF power amplifiers are more efficient when operating at or near maximum or peak power. At the same time many high-power RF power amplifiers contain non-linear components with a limited dynamic range that distort the transmitted signal. This is particularly true when the peak to average power ratio (PAPR) is high.

The non-linear distortions arise in-band and directly affect the link performance associated with a frequency band in which a user communicates with the network. For orthogonal frequency division multiplexing (OFDM) and orthogonal frequency division multiple access (OFDMA) signals, this distortion may be measured using signal-to-interference-and-noise-ratios (SINR) and error vector magnitudes (EVM), among others. Nonlinear power amplifiers also cause out-of-band (OOB) distortions, which affect other users on the network that are using other frequency bands. The OOB distortion is related to adjacent channel interference (ACI), which indicates how much an adjacent channel to a frequency band is "polluted" by the distorted transmission.

In some cases, a UE may perform power backoff (BO) to avoid nonlinear distortions. In some approaches, a closed loop power backoff may be applied to the nonlinear power amplifier to control the level of nonlinear distortion. The closed loop power BO control adjustment allows the amplifier to be adapted to current conditions, allowing for lower power BO and therefore higher power efficiency under many circumstances. However, such UE-based closed loop power BO may require significant amount of overhead for measurements shared between a base station and UEs.

In other approaches, when UEs experience downlink interference originating from downlink transmissions within a neighboring cell, an initiating base station in the neighboring cell may perform backoff adaptation, hence relaxing its adjacent channel leakage ratio (ACLR). During network-based backoff adaptation, the initiating base station may inform neighbor base stations of a performed backoff adaption, after which other neighbor base stations gather downlink interference measurements from UEs in their cells and report these downlink interference measurements to the initiating base station. However, this approach does not indicate whether a UE reporting of high downlink interference in neighboring cells is caused by adjacent channel leakage or ACI resulting from the relaxed ACLR associated with the performed backoff adaptation.

Therefore, to allow serving base stations or UEs to confirm whether high downlink interference is a result of increased ACI associated with a performed backoff adaption at a neighbor base station, the present disclosure provides for UEs in a serving cell to obtain a plurality of interference measurements of one or more dedicated reference signal resources prior to and after a backoff adaptation associated with a first network entity such as the neighbor base station, obtain one or more measurements of a received signal associated with the first network entity, and transmit, to a second network entity of a serving cell such as the serving base station, an interference report indicating whether downlink interference originates from the first network entity based on the plurality of interference measurements and the one or more measurements of the received signal.

By performing UE-based downlink interference measurements and received signal strength measurements, the network having been provided the interference report may confirm that there is an increase in downlink interference from one or more neighboring cells in the band in which ACI is leaking after a base station backoff adaptation. The network also may confirm that the source of the downlink interference is indeed the base station having adapted its backoff value. The network also may confirm that the downlink interference from the neighboring cell(s) is substantially constant after the backoff adaptation. Thus, the network may determine that the downlink interference is due to the backoff adaption, and therefore the network may notify the initiating base station having performed backoff adaptation to return to a normal operating mode or undo or modify the backoff adaptation.

Thus, by configuring the UE to obtain interference measurements before and after backoff adaptation and further obtain neighboring cell signal strength measurements, the network may thereby alleviate interference onto neighboring cells. Moreover, by allowing a network to configure a UE with interference measurements prior to and after backoff adaptation by an initiating network entity, the amount of control signaling overhead between the network and UE may be reduced as compared with the approaches involving UE-based closed-loop power backoff and network-based backoff adaptation for ACLR control. Additionally, by improving power consumption at network entities and by better avoiding inter-cell signal interference, the network entities and the UE may conserve processing resources and signaling resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for nonaccess stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may be configured to support interference measurements configuration for assessing impact of network entity backoff adaptation relaxation. For example, the UE 104 of FIG. 1 may include interference measurements component 198 configured to obtain a plurality of interference measurements of one or more first reference signals, the plurality of interference measurements including a measurement obtained prior to and after a backoff adaptation associated with a first network entity; obtain one or more signal strength measurements of a second reference signal received from the first network entity; and send, to a second network entity of a serving cell, an interference report indicating whether downlink interference originates from the first network entity based at least in part on the plurality of interference measurements and the one or more signal strength measurements.

Referring again to FIG. 1, in certain aspects, the base station 180 of FIG. 1 may include an interference measurements configuration component 199 configured to obtain, from a user equipment (UE), an interference report indicating whether downlink interference to the UE originates from a network entity based at least in part on a plurality of interference measurements of one or more first reference signals and one or more signal strength measurements of a second reference signal, the plurality of interference measurements including a measurement obtained prior to and after a backoff adaptation associated with the network entity, and the second reference signal being associated with the network entity; and send, to the network entity, a feedback signal indicating whether the network entity is to modify the backoff adaptation based on the downlink interference to the UE.

Figure 2:
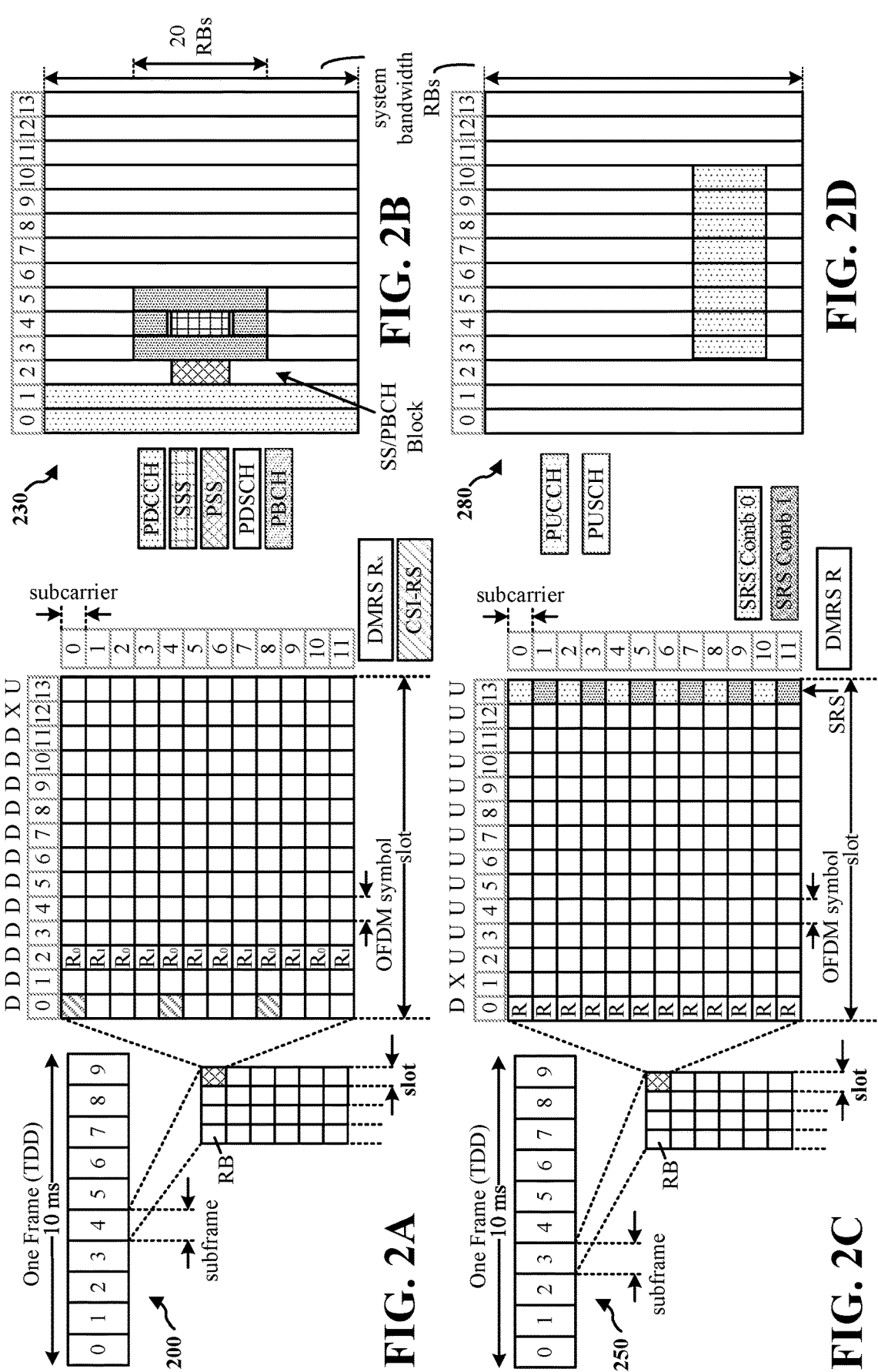
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a CORESET. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
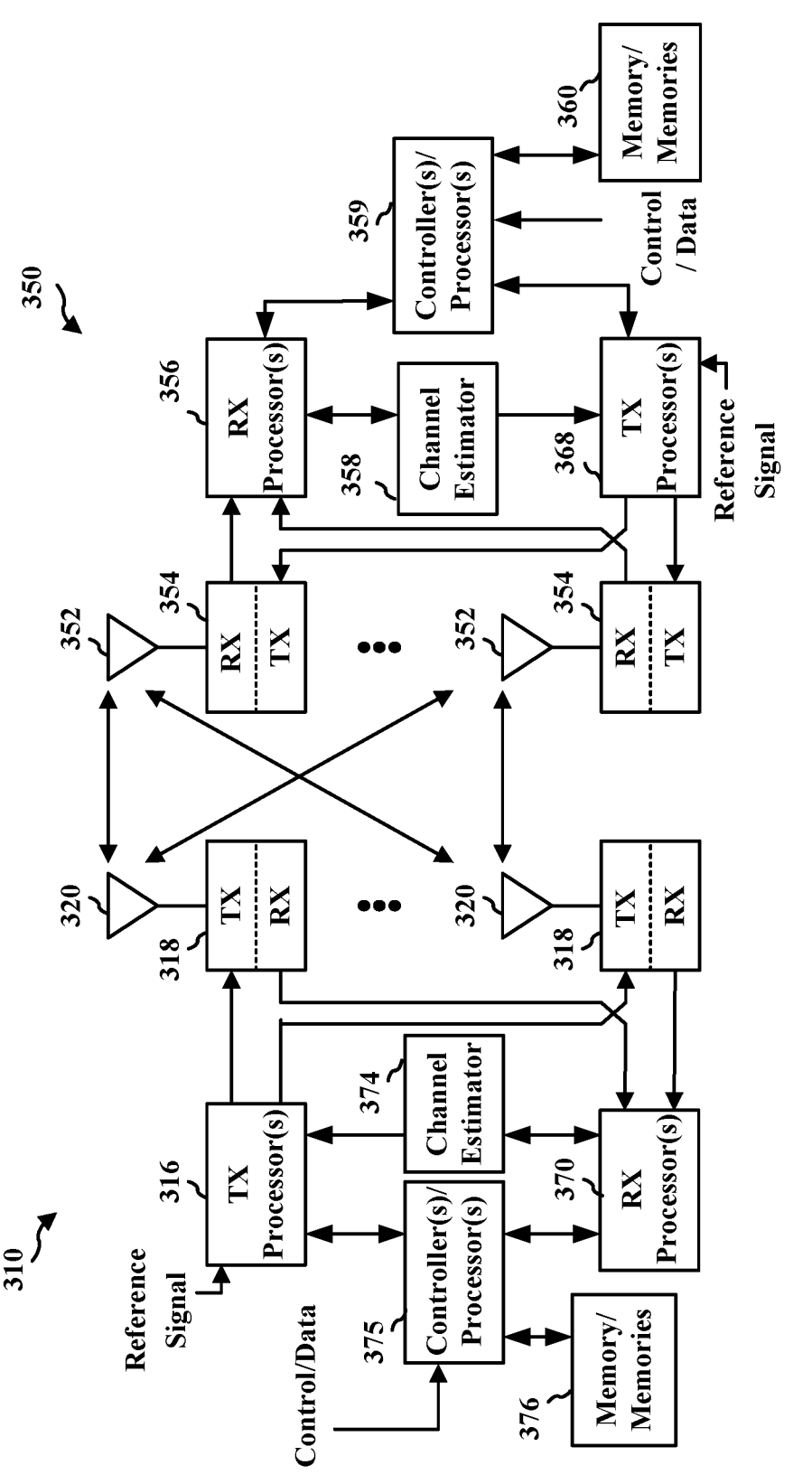
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to one or more controllers/processors 375. The one or more controllers/processors 375 implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The one or more controllers/processors 375 provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The one or more transmit (TX) processors 316 and the one or more receive (RX) processors 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The one or more TX processors 316 handle mapping to signal constellations based on various modulation and coding schemes (MCS) (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the one or more receive (RX) processors 356. The one or more TX processors 368 and the one or more RX processors 356 implement layer 1 functionality associated with various signal processing functions. The one or more RX processors 356 may perform spatial processing on the information to recover any spatial streams destined for the UE 350. If multiple spatial streams are destined for the UE 350, they may be combined by the one or more RX processors 356 into a single OFDM symbol stream. The one or more RX processors 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the one or more controllers/processors 359, which implement layer 3 and layer 2 functionality.

The one or more controllers/processors 359 may each be associated with one or more memories 360 that store program codes and data. The one or more memories 360, individually or in any combination, may be referred to as a computer-readable medium. In the UL, the one or more controllers/processors 359 provide demultiplexing between transport and logical channels, packet reassembly, deciphering, header decompression, and control signal processing to recover IP packets from the EPC 160. The one or more controllers/processors 359 are also responsible for error detection using an ACK and/or NACK protocol to support HARQ operations.

Similar to the functionality described in connection with the DL transmission by the base station 310, the one or more controllers/processors 359 provide RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the one or more TX processors 368 to select the appropriate coding and modulation schemes, and to facilitate spatial processing. The spatial streams generated by the one or more TX processors 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to one or more RX processors 370.

The one or more controllers/processors 375 may each be associated with one or more memories 376 that store program codes and data. The one or more memories 376, individually or in any combination, may be referred to as a computer-readable medium. In the UL, the one or more controllers/processors 375 provide demultiplexing between transport and logical channels, packet reassembly, deciphering, header decompression, control signal processing to recover IP packets from the UE 350. IP packets from the one or more controllers/processors 375 may be provided to the EPC 160. The one or more controllers/processors 375 are also responsible for error detection using an ACK and/or NACK protocol to support HARQ operations.

At least one of the one or more TX processors 368, the one or more RX processors 356, and the one or more controllers/processors 359 may be configured to perform aspects in connection with interference measurement component 198 of FIG. 1.

At least one of the one or more TX processors 316, the one or more RX processors 370, and the one or more controllers/processors 375 may be configured to perform aspects in connection with interference measurement configuration component 199 of FIG. 1.

In some examples, the inbound RF signal and/or outbound RF signal may include a mmWave signal. In addition, the inbound RF signal and/or outbound RF signal may include one or more component carriers within a mmWave bandwidth (e.g., a wideband). For example, the inbound RF signal may include multiple (e.g., two or more) component carriers of the mmWave bandwidth, whereas the outbound RF signal may include at least one component carrier of the mmWave bandwidth. In some examples, a single component carrier may be sufficient for uplink use cases. In 5G NR, mmWave also may be referred to as Frequency Range 2 (FR2) and include carriers from about 24 GHz-53 GHz, although this may be expanded or changed over time. The systems described herein may also be applied to other carriers including sub-6, e.g. frequencies below 6 GHz also referred to as Frequency Range 1 (FR1).

Figure 4:
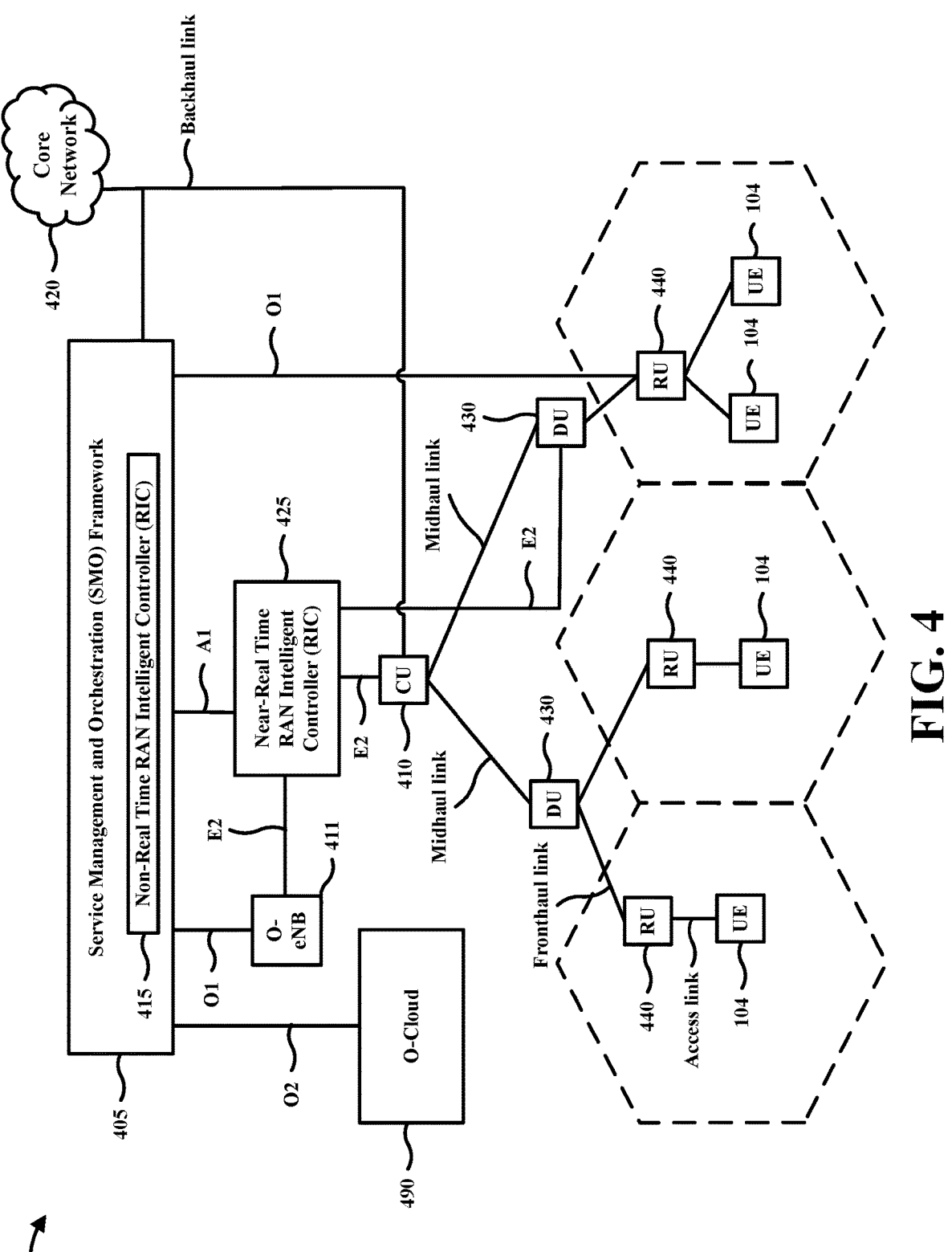
FIG. 4 is a diagram illustrating an example of a disaggregated base station, according to some implementations of the present disclosure.

FIG. 4 is a diagram illustrating an example of a disaggregated base station 400, in accordance with one or more implementations of the present disclosure. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 400 architecture may include one or more CUs 410 that can communicate directly with a core network 420 via a backhaul link, or indirectly with the core network 420 through one or more disaggregated base station units (such as a Near-RT RIC 425 via an E2 link, or a Non-RT RIC 415 associated with a Service Management and Orchestration (SMO) Framework 405, or both). A CU 410 may communicate with one or more DUs 430 via respective midhaul links, such as an F1 interface. The DUs 430 may communicate with one or more RUs 440 via respective fronthaul links. The fronthaul link, the midhaul link, and the backhaul link may be generally referred to as "communication links." The RUs 440 may communicate with respective UEs 104 via one or more RF access links. In some aspects, the UE 104 may be simultaneously served by multiple RUs 440. The DUs 430 and the RUs 440 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 4GPP. In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
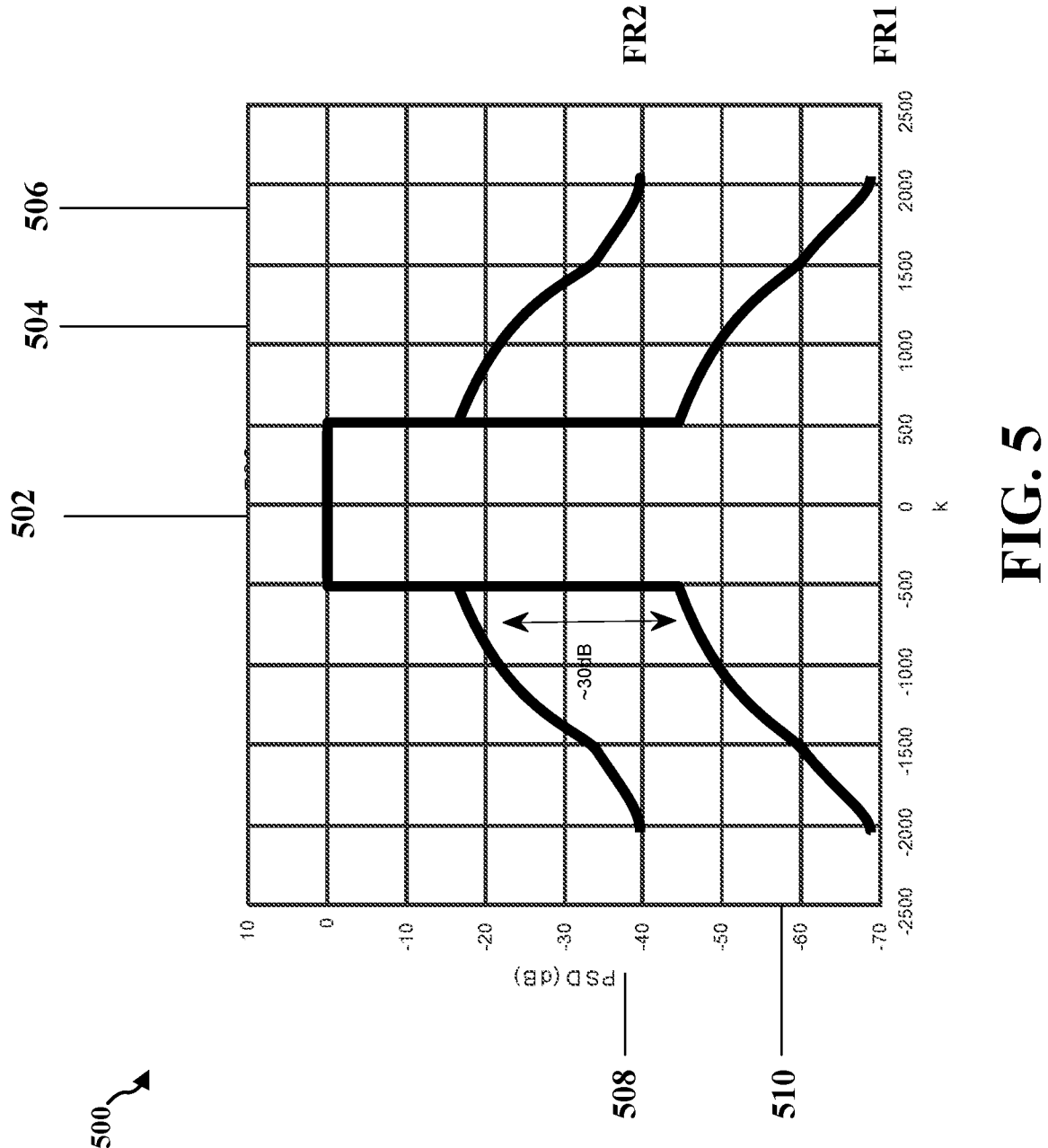
FIG. 5 is a diagram illustrating power spectral density for in-band and out-of-band locations for two different signals across a frequency range within a radio access network, according to some implementations of the present disclosure.

FIG. 5 is a diagram 500 illustrating power spectral density (PSD) on the vertical axis for in-band (k) and OOB locations for two different signals across a frequency range on the horizontal axis. k represents a center frequency of an in-band signal 502. As an example, in frequency range 1 (FR1) or Sub-6 communications for a carrier below 6 GHz as described for 5G NR, the transmitters maintain an ACI/ACLR (Adjacent Channel Leakage Power Ratio) of generally no larger than −45 dB. The FR1 signal 510 is represented by the main in band signal 502 and the side bands extending laterally from the central channel starting at about −45 dB and extending laterally and downward as the OOB distortion diminishes with distance from the center frequency. In use, equipment may be set to −(47-49) dB to ensure that −45 dB is not exceeded.

Similarly, in frequency range 2 (FR2) or mmWave communications, the transmitters maintain an ACI/ACLR of generally no larger than −15 dB because signals at these frequencies are less sensitive to OOB distortion. The FR2 signal 508 is superimposed over the FR1 signal 510 and also centered at k with the same in band signal 502. The side bands of the FR2 signal 508 start at about −15 dB and also extend laterally and downward with distance from the in-band signal. In this example the FR2 PSD is 30 dB less than that of the FR1 PSD as shown, indicating that the ACLR of FR2 is more relaxed than the ACLR of FR1. In use, equipment may be set to −(17-19) dB to ensure that −15 dB is not exceeded. As described herein, the power spectral density or another measure of the signal power may be taken in band at k and OOB at multiple different locations 504, 506 that are offset from the center frequency k. Measurements at multiple locations 504, 506 provide information about how quickly the signals diminish as the offset increases. In this example, the measurements are taken at about ±1200 and ±1800 as indicated in the diagram, however, other offset locations may be used to suit different types of radio, and communication network systems.

Equipment manufacturers meet ACI/ACLR standards by calibrating the equipment before use. This is an open loop configuration in that the equipment does not respond to circumstances in the field, such as changes in the radio network environment, changes in the operational conditions of the equipment and degradation due to age and other physical factors. Just as the equipment is designed not to overheat in the most extreme conditions, the equipment is designed not to exceed the ACI/ACLR standards in the most extreme conditions. This overdesign means that the ACI/ACLR is often much lower than necessary. In many conditions the PA power may be 6-10 dB lower than necessary and the link budget is significantly reduced.

Figure 6:
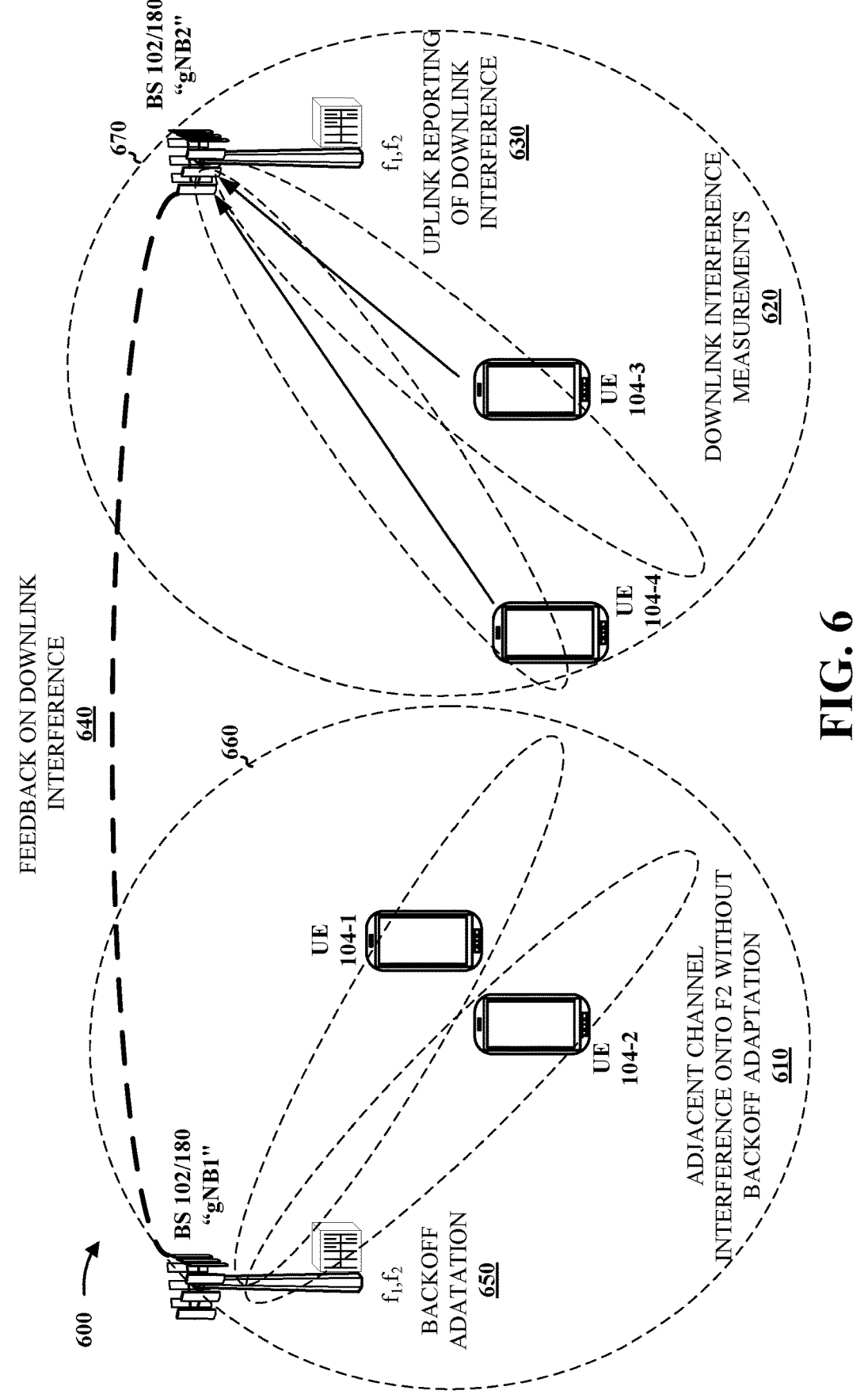
FIG. 6 is a diagram of a network between a serving cell and a neighboring cell, according to some implementations of the present disclosure.

FIG. 6 is a diagram of a network 600 between a serving cell 670 and a neighboring cell 660, according to some implementations of the present disclosure. The serving cell 670 includes UEs 104-3 and 104-4 served by base station 102/180 (denoted as "gNB2"). The neighboring cell 660 includes UEs 104-1 and 104-2 served by base station 102/180 (denoted as "gNB1"). The UEs 104-1 and 104-2 may receive downlink information from gNB1 and transmit uplink information back to gNB 1. Similarly, the UEs 104-3 and 104-4 may receive downlink information from gNB2 and transmit uplink information back to gNB2.

In some aspects, each of the gNB1 and gNB2 may operate on multiple subbands, $f_1$ and $f_2$. In other aspects, each of the gNB1 and gNB2 may operate on a single subband, either $f_1$ or $f_2$ but not both. The gNB 1 and gNB2 may operate on the same subband (or set of frequencies) in some aspects, or may operate on different subbands (or set of frequencies). For example, gNB1 may operate on FR2 while gNB2 operates on FR1. In another example, both gNB1 and gNB2 may operate on FR2.

In some cases, the gNB2, UEs 104-3 and/or 104-4 may experience interference originating from communications between gNB1 and the UEs 104-1, 104-2 within the neighboring cell 660. In some approaches, the nonlinear distortion resulting in this interference may be controlled at least in part by changing the power BO in a closed loop control technique. The nonlinear emissions may be measured directly or indirectly and then the power BO is adjusted using the control loop to maintain a distortion level that the network may tolerate. In some examples, the network (e.g., gNB2) may measure the ACI, ACLR, and perhaps also the in-band EVM or any other suitable representation of the distortion caused by the transmitter. Based on the network ability to manage the interferences and bandwidth allocations, the network (e.g., gNB2) may decide for each link how much power BO to apply to each side of the link. The larger the load on the network (e.g., larger the number of UEs), the larger the power BO that the network may configure from the UE to reduce the total nonlinear interferences and optimize the overall network capacity. Since the distortions may be different for different links even with the same base station, each link may be controlled separately.

Using distortion measurements of UL and DL signals, the network may determine a power BO for each direction. The network (e.g., gNB2) may control the UE (e.g., to UE 104-3 and/or UE 104-4) by sending a message that includes adjustment of its power BO in real time. The network can also adjust its own power BO based on measurements received from the UE (e.g., via downlink interference uplink reporting). The power BO message may be sent as differential or absolute values regarding the PA power or the PA BO. In some implementations, the power BO is differential to indicate that that power BO should be increased or decreased by one or more steps. The amount of BO may be iterated up and down until a satisfactory level of OOB interference is reached. Since the communications environment and the UE equipment are not changing rapidly, the total overhead for the power BO control messages and measurement messages may be negligible.

In other approaches where the UEs 104-3 and/or 104-4 experience downlink interference originating from downlink transmissions between gNB1 and the UEs 104-1, 104-2 within the neighboring cell 660, the base station 102/180 in the neighboring cell 660 (e.g., gNB 1) may perform backoff adaptation 650, hence relaxing its ACLR. In some aspects, the base station 102/180 in the neighboring cell 660 may inform neighbor base stations of the performed backoff adaptation 650. The other neighbor base stations (e.g., gNB2) then gather downlink interference measurements from UEs in their cells (e.g., downlink interference measurements 620 obtained by UEs 104-3, 104-4 and reported s in uplink reporting 630) and report these downlink interference measurements to the initiating base station (e.g., via feedback signaling 640 regarding the downlink interference back to the gNB 1). However, this approach does not indicate whether a reporting of high downlink interference from neighboring cells is caused by adjacent channel leakage due to the relaxed ACLR associated with the performed backoff adaptation 650.

Therefore, to allow serving base stations or UEs to confirm whether high downlink interference is a result of increased ACI associated with a performed backoff adaption at a neighbor base station, the present disclosure provides for allowing UEs in a serving cell to obtain a plurality of interference measurements of one or more dedicated reference signal resources prior to and after a backoff adaptation associated with a first network entity, obtain one or more measurements of a received signal associated with the first network entity, and transmit, to a second network entity of a serving cell, an interference report indicating whether downlink interference originates from the first network entity based on the plurality of interference measurements and the one or more measurements of the received signal.

Particular implementations of the subject matter described in this disclosure can be implemented to realize one or more of the following potential advantages. The overall system may realize significant gain in terms of base station energy consumption. By performing UE-based downlink interference and received signal strength measurements, the network may confirm that there is an increase in downlink interference from one or more neighboring cells in the band in which ACI is leaking after a base station backoff adaptation. The network also may confirm that the source of the downlink interference is indeed the base station having adapted its backoff value. The network also may confirm that the downlink interference from the neighboring cell(s) is substantially constant after the backoff adaptation.

Referring back to FIG. 6, the base station 102/180 in the neighboring cell 660 (e.g., gNB1) may be transmitting downlink signals to UEs 104-1, 104-2 on a particular subband, which causes adjacent channel interference onto other subbands. Alternatively, the downlink signals may be transmitted on a particular band, which causes adjacent channel interference in other bands. In some aspects, the base station may be transmitting without any backoff adaptation. In other aspects, the base station may be transmitting with backoff adaptation.

Initially, a UE (e.g., UE 104-3) may perform downlink interference measurements 620 on certain channel state information reference signal (CSI-RS) resources, before a time instant, to, that denotes the instant at which backoff adaptation 650 is performed at an initiating base station (e.g., gNB1 in the neighboring cell 660). The UE may similarly perform downlink interference measurements 620 after the time instant, to when backoff adaptation 650 is performed. The UE may then transmit an uplink signal containing an interference report 630 that indicates the obtained downlink interference measurements 620. The uplink signal or interference report may also include comparison results or determinations, indicating the results of the UE comparing the interference measurements 620 or other measurements with one or more thresholds or determining whether such measurements meet one or more thresholds. The base station of the serving cell 670 (e.g., gNB2) receives the measurement information and/or comparison results based on the measurement information and then informs the initiating base station as to whether the initiating base station is recommended to perform different or no backoff adaptation via feedback signaling 640.

In some aspects, the CSI-RS resources on which the interference measurements are obtained by the UE 104-3, 104-4 may include zero power channel state information reference signal (ZP CSI-RS) resources or non-zero power CSI-RS (NZP CSI-RS) resources. In some aspects, the interference measurement obtained after the backoff adaptation may be obtained on the same CSI-RS resources as those on which the interference measurements were obtained prior to the backoff adaptation 650. These CSI-RS resources may be resources in which it is expected that adjacent channel interference may increase. In some aspects, the UE 104-3, 104-4 may be configured to compare the obtained interference measurements against an interference threshold value. Particularly, the UE 104-3, 104-4 may determine whether the difference between the interference measurement obtained after the backoff adaptation 650 and the interference measurement obtained prior to the backoff adaptation 650 is greater than or equal to the interference threshold value. In some aspects, the interference measurements may be in terms of dBm. Similarly, the interference threshold value may be in terms of dBm.

In other aspects, the UEs 104-3, 104-4 in the serving cell 670 may obtain additional measurements, such as received signal strength measurements. In some examples, the UEs 104-3, 104-4 may acquire received signal received power (RSRP) measurements of a downlink signal received from the initiating base station (e.g., gNB1). The initiating base station, gNB1, may be identified as a neighbor base station for the UE performing the downlink interference measurements. In some aspects, the signal strength of the received signal from the initiating base station that relaxed its ACLR may be greater than or equal to a signal strength threshold value. The signal strength threshold value may be in terms of dBm. In some aspects, the UE may obtain the RSRP measurement of the received signal on a synchronization signal block (SSB) or on specific CSI-RS resources. In comparing the signal strength of the received signal, the UE may determine whether the RSRP measurement exceeds the signal strength threshold value over a specified period of time. In some aspects, the specified period of time corresponds to a period starting N slots prior to the time instant, to, of the backoff adaptation 650 up to K slots after the time instant, to, of the backoff adaptation 650.

In some aspects, the UE may obtain interference measurements of the CSI-RS resources at respective time slots within a time window after the time instant, to, of the backoff adaptation 650. In some aspects, the UE may be configured to determine a variance among the interference measurements between multiple time slots within a time window after occurrence of the backoff adaptation 650 performed by the initiating base station. In this regard, the interference report may indicate whether the variance among the interference measurements between the first time slot and the second time slot within the time window is less or equal to than a variance threshold value. In some aspects, the variance threshold value may be in terms of dBm.

In some aspects, instead of the UEs, the serving cell base station (e.g., gNB2) may determine whether there is an increase in the downlink interference in one or more subbands after the backoff adaptation 650 performed by the initiating base station. For example, gNB2 may determine based on interference measurements 620 whether the difference between interference measurements obtained from UEs 104-3, 104-4 after the backoff adaptation 650 and prior to the backoff adaptation 650 is greater than or equal to the interference threshold value. Similarly, the gNB2 may determine whether an RSRP measurement, reported from the UE, of a downlink signal received from gNB 1, exceeds a signal strength threshold value over a specified period of time, and whether the variance among interference measurements is less than or equal to a variance threshold. Thus, either the UEs or the base station may perform the threshold comparisons or determinations.

For more robustness, an additional threshold determination may be performed based on the activity of other neighbor cells. In particular, this threshold determination may be performed when the neighbor base stations of gNB2, where gNB2 is the base station of the serving cell in which the UE is performing downlink interference measurements of the neighboring cells, share a same resource utilization. In this regard, if the activity level such as the total RB usage in all of the neighbor cells is less than a resource usage threshold value, then the serving cell base station may determine that the high downlink interference is not due to transmissions directed towards other UEs and thus instead originates from the base station that performed the backoff adaptation 650. In some aspects, the base station may determine whether a total physical resource block (PRB) usage of base stations in all neighbor cells is lesser than the resource usage threshold value.

The aforementioned procedure described in relation to FIG. 6 may be performed for each UE in a cell affected by the initiating base station having performed backoff adaptation (e.g., UE 104-3, 104-4). If all the aforementioned conditions are satisfied for at least one UE in at least one neighbor cell (e.g., the difference in interference measurements is greater than the interference threshold value, the RSRP measurement is greater than the signal strength threshold value, the interference measurement variance is less than the variance threshold value, and the total PRB usage is less than the resource usage threshold value), then the serving base station may request the initiating base station having performed backoff adaptation to revert back to a normal operating mode or otherwise modify its backoff adaptation.

In some aspects, the downlink interference corresponds to operating band unwanted emissions (OBUE). In case the initiating base station (e.g., gNB 1) performs backoff adaptation and this results in occurrence of the OBUE, then the affected UEs in the neighboring cell 660 (e.g., UEs 104-1, 104-2) and in the serving cell 670 (e.g., UEs 104-3, 104-4) may check the aforementioned conditions (e.g., difference in interference measurements is greater than the interference threshold value, the RSRP measurement is greater than the signal strength threshold value, the interference measurement variance is less than the variance threshold value, and the total PRB usage is less than the resource usage threshold value) in order to make a similar determination of whether the downlink interference is a result of the initiating base station having performed backoff adaptation. However, in these aspects, the UEs may perform interference measurements in the CSI-RS resources within the subband(s) affected by the ACI, rather than within a different frequency band, and the UEs may perform interference measurements in the same cell operating in the affected bands, rather than in a neighbor cell.

In some aspects, the serving cell base station (e.g., gNB2) may transmit, to a UE (e.g., 104-3, 104-4), a downlink configuration configuring the UE to perform interference measurements of the CSI-RS resources and to send the interference report 630 containing the downlink interference measurements 620. In other aspects, the downlink configuration configures the UE to perform interference measurements of the CSI-RS resources and to send the interference report 630 containing respective comparison results for the downlink interference measurements 620 and one or more measurements of the received signal (e.g., RSRP). In this regard, the downlink configuration may configure the UE with a time instant value that corresponds to when the backoff adaptation occurs in the initiating base station (e.g., gNB1). The downlink configuration also may configure the UE with a time window for obtaining interference measurements prior to a time instant (e.g., to) of the backoff adaptation and after the time instant of the backoff adaptation. The downlink configuration also may configure the UE with multiple threshold values for comparisons with the interference measurements (e.g., interference threshold value, variance threshold value) and the measurements of the received signal (e.g., signal strength threshold value).

FIG. 7 is a flowchart of a method or process 700 of wireless communication. The process 700 may be performed by a UE or a component of a UE (e.g., the UE 104; apparatus 902; the UE 350; or a processing system, which may include the memory and components configured to perform each of the blocks of the process, and which may be the entire UE or a component of the UE, such as the TX processor(s) 368, the RX processor(s) 356, and/or the controller/processor(s) 359). According to various aspects, one or more of the illustrated operation of the process 700 may be omitted, transposed, and/or contemporaneously performed.

At 710, the UE may obtain a plurality of interference measurements of one or more first reference signals. The plurality of interference measurements includes a measurement obtained prior to and after a backoff adaptation associated with a first network entity. The first network entity may be, for example, gNB 1 in FIG. 6. The one or more first reference signals may be obtained in one or more reference signal resources associated with a second network entity serving the UE, such as gNB2 in FIG. 6. In some aspects, to obtain measurements, the UE receives a signal and generates a measurement based on measuring the received signal. For example, the UE may receive a reference signal on the one or more reference signal resources and generate an interference measurement based on the UE measuring the reference signal. A backoff adaptation associated with the first network entity may be, for example, a power backoff, such as a reduction in radiated power or transmission power emitted from a power amplifier of the base station 102/180 ("gNB1"), or an adapted power backoff, such as a change in reduction in such radiated power or transmission power. Such backoff adaptation may be associated with a relaxed ACLR, and thus greater ACI, affecting the UE.

In some aspects, the plurality of interference measurements includes one or more first interference measurements obtained prior to the backoff adaptation and one or more second interference measurements obtained after the backoff adaptation, where the one or more first interference measurements and the one or more second interference measurements are associated with same reference signal resources. The same reference signal resources may refer to the same subcarrier(s) before and after the backoff adaptation, the same relative time domain location (e.g., same symbol number(s), slot identifier(s), etc.) before and after the backoff adaptation, or a combination of these (e.g., same RBs). In some aspects, the one or more first reference signals are associated with zero power channel state information reference signal (ZP CSI-RS) resources or non-zero power CSI-RS (NZP CSI-RS) resources. In some aspects, the plurality of interference measurements of the one or more first reference signals are obtained by the UE in one or more subbands associated with a same cell as the first network entity. In other aspects, the plurality of interference measurements of the one or more first reference signals are obtained by the UE in one or more subbands associated with a different cell than the first network entity.

At 720, the UE may obtain one or more signal strength measurements of a second reference signal received from the first network entity. For example, the UE may receive a downlink signal from the first network entity and generate a measurement based on the UE measuring the received signal. In some aspects, the one or more signal strength measurements of the second reference signal include a received signal received power (RSRP) measurement of the second reference signal. In this regard, the interference report (transmitted at 730) may indicate whether the RSRP measurement exceeds a signal strength threshold value. In some aspects, the second reference signal may be a synchronization signal block (SSB) or a channel state information reference signal (CSI-RS). In some aspects, the UE may determine whether the RSRP measurement exceeds the signal strength threshold value over a specified period of time, in which the specified period of time is a period starting a first number (N) of slots prior to a time instance of the backoff adaptation and ending up to a second number (K) of slots after the time instance of the backoff adaptation.

In some aspects, the UE may obtain a plurality of additional interference measurements of additional reference signals at respective time slots within a time window after a time instance of the backoff adaptation. In this regard, the interference report (transmitted at 730) may indicate whether a variance among the plurality of additional interference measurements between a first time slot and a second time slot within the time window is less than a variance threshold value.

In some aspects, one or more additional network entities in one or more neighbor cells of the second network entity may share a resource allocation with the first network entity, and the interference report (transmitted at 730) may indicate whether a total physical resource block usage of the resource allocation is less than a resource usage threshold value.

At 730, the UE may send, to a second network entity of a serving cell, an interference report indicating whether downlink interference originates from the first network entity based at least in part on the plurality of interference measurements (obtained at 710) and the one or more signal strength measurements (obtained at 720). For example, downlink interference may be indicated to originate from the first network entity in response to a difference between the plurality of interference measurements obtained at 710 exceeding an interference threshold value, and in response to the RSRP measurement obtained at 720 exceeding the signal strength threshold value. Downlink interference may also be indicated to originate from the first network entity in response to a variance among the additional interference measurements further being less than the variance threshold value. Downlink interference may further be indicated to originate from the first network entity in response to a total physical resource block usage of the shared resource allocation further being less than the resource usage threshold value.

In some aspects, the interference report indicates whether a difference between one or more second interference measurements occurring after the backoff adaptation and one or more first interference measurements occurring prior to the backoff adaptation exceeds the interference threshold value.

Process 700 may include additional aspects, such as any single aspect or any combination of aspects described below and/or in connection with one or more other processes described elsewhere herein.

In some aspects, the downlink interference corresponds to operating band unwanted emissions (OBUE).

In some aspects, the UE may determine whether there is an increase in the downlink interference in one or more subbands after the backoff adaptation associated with the first network entity.

In some aspects, the UE may receive a downlink configuration configuring the UE to perform the plurality of interference measurements of the one or more first reference signals and to send the interference report including the plurality of interference measurements.

In other aspects, the UE may receive a downlink configuration configuring the UE to perform the plurality of interference measurements of the one or more first reference signals and to send the interference report including respective threshold comparison results for the plurality of interference measurements and the one or more signal strength measurements. In some aspects, the downlink configuration configures the UE with a time instant value indicating when the backoff adaptation occurs in the first network entity. In other aspects, the downlink configuration configures the UE with a time window for interference measurement spanning from a first time prior to a time instance of the backoff adaptation and until a second time after the time instance of the backoff adaptation. In still other aspects, the downlink configuration configures the UE with a plurality of threshold values for comparisons with the plurality of interference measurements and the one or more signal strength measurements.

FIG. 8 is a flowchart of a method or process 800 of wireless communication. The process may be performed by network entity such as a base station or a component of a base station (e.g., the base station 102, 180; apparatus 1002; the device 310; the CU 410, DU 430, or RU 440; or a processing system, which may include the memory and component configured to perform each of the blocks of the process, and which may be the entire base station or a component of the base station, such as the TX processor(s) 316, the RX processor(s) 370, and/or the controller/processor(s) 375). According to various aspects, one or more of the illustrated operations of the process 800 may be omitted, transposed, and/or contemporaneously performed.

At 810, the base station (hereinafter referred to as a "first network entity") may obtain, from a UE (e.g., 104), an interference report indicating whether downlink interference to the UE originates from a second network entity (e.g., another base station) based at least in part on a plurality of interference measurements of one or more first reference signals and one or more signal strength measurements of a second reference signal. The first network entity may be, for example, gNB 2 in FIG. 6, and the second network entity may be, for example, gNB 1 in FIG. 6. The plurality of interference measurements includes a measurement obtained prior to and after a backoff adaptation associated with the second network entity, and the second reference signal is associated with the second network entity. A backoff adaptation associated with the second network entity may be, for example, a power backoff, such as a reduction in radiated power or transmission power emitted from a power amplifier of the base station 102/180 ("gNB1"), or an adapted power backoff, such as a change in reduction in such radiated power or transmission power. Such backoff adaptation may be associated with a relaxed ACLR, and thus greater ACI, affecting the UE.

In some aspects, the plurality of interference measurements includes one or more first interference measurements occurring prior to the backoff adaptation and one or more second interference measurements occurring after the backoff adaptation in association with same reference signal resources. The same reference signal resources may refer to the same subcarrier(s) before and after the backoff adaptation, the same relative time domain location (e.g., same symbol number(s), slot identifier(s), etc.) before and after the backoff adaptation, or a combination of these (e.g., same RBs). In some aspects, the interference report indicates whether a difference between the one or more second interference measurements and the one or more first interference measurements exceeds an interference threshold value. In some aspects, the one or more first reference signals are associated with zero power channel state information reference signal (ZP CSI-RS) resources or non-zero power CSI-RS (NZP CSI-RS) resources.

In some aspects, the one or more signal strength measurements of the second reference signal include an RSRP measurement of the second reference signal. In this regard, the interference report may further indicate whether the RSRP measurement exceeds a signal strength threshold value. In other aspects, the base station may determine whether the RSRP measurement exceeds the signal strength threshold value. In some aspects, the first network entity may determine whether the RSRP measurement exceeds the signal strength threshold value over a specified period of time. For example, the specified period of time may be a period starting a first number (N) of slots prior to a time instance of the backoff adaptation and ending up to a second number (K) of slots after the time instance of the backoff adaptation.

In some aspects, the interference report indicates whether a variance among a plurality of additional interference measurements of additional reference signals transmitted between a first time slot and a second time slot within a time window after a time instance of the backoff adaptation is less than a variance threshold value.

In some aspects, one or more additional network entities in one or more neighbor cells of the first network entity share a resource allocation with the second network entity. In this regard, the first network entity may determine whether a total physical resource block usage of the resource allocation is less than a resource usage threshold value.

In some aspects, the interference report may further indicate whether there is an increase in the downlink interference in one or more subbands after the backoff adaptation associated with the second network entity.

At 820, the first network entity may send, to the second network entity, a feedback signal indicating whether the second network entity is to modify the backoff adaptation based on the downlink interference to the UE. The feedback signal indicating to modify the backoff adaptation may be sent in response to the interference report indicating that the downlink interference to the UE originates from the second network entity. For example, the interference report may indicate that the downlink interference originates from the first network entity in response to a difference between the plurality of interference measurements exceeding an interference threshold value, and in response to the RSRP measurement exceeding the signal strength threshold value. Downlink interference may also be indicated to originate from the first network entity in response to a variance among the additional interference measurements further being less than the variance threshold value. Downlink interference may further be indicated to originate from the first network entity in response to a total physical resource block usage of the shared resource allocation further being less than the resource usage threshold value.

Process 800 may include additional aspects, such as any single aspect or any combination of aspects described below and/or in connection with one or more other processes described elsewhere herein.

In some aspects, the first network entity may send, to the UE, a downlink configuration configuring the UE to perform the plurality of interference measurements of the one or more first reference signals and to send the interference report including the plurality of interference measurements. Additionally or alternatively, in other aspects, the first network entity may send, to the UE, the downlink configuration configuring the UE to perform the plurality of interference measurements of the one or more first reference signals and to send the interference report including respective threshold comparison results for the plurality of interference measurements and the one or more signal strength measurements. In some aspects, the downlink configuration configures the UE with a time instant value indicating when the backoff adaptation occurs in the second network entity. Additionally or alternatively, in other aspects, the downlink configuration configures the UE with a time window for interference measurement spanning from a first time prior to a time instance of the backoff adaptation until a second time after the time instance of the backoff adaptation. Additionally or alternatively, in still other aspects, the downlink configuration configures the UE with a plurality of threshold values for comparisons with the plurality of interference measurements and the one or more signal strength measurements.

Figure 9:
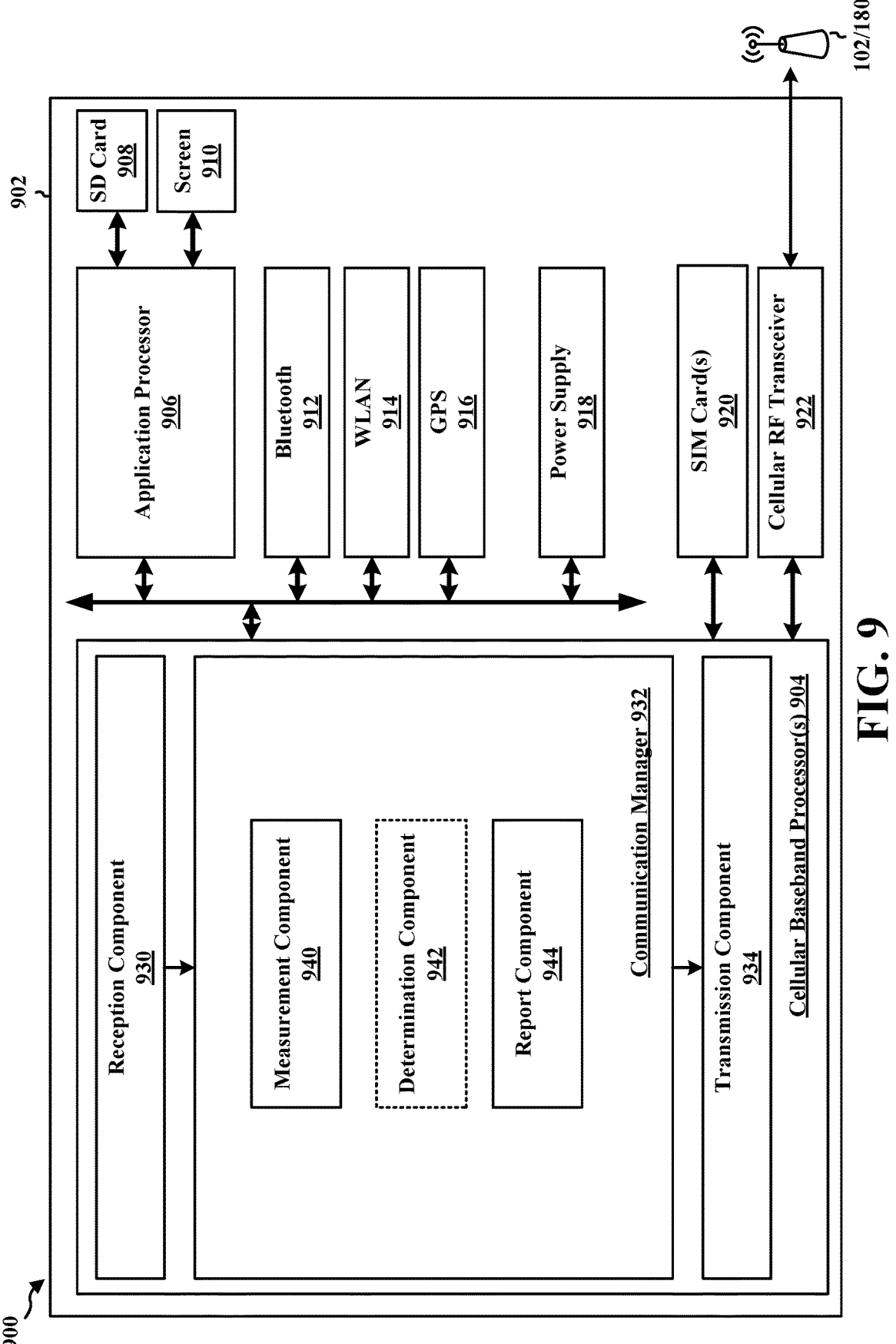
FIG. 9 is a diagram illustrating an example of a hardware implementation for an example apparatus, according to some implementations of the present disclosure.

FIG. 9 is a diagram 900 illustrating an example of a hardware implementation for an apparatus 902. The apparatus 902 is a UE such as UE 104 and includes one or more cellular baseband processors 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The one or more cellular baseband processors 904 communicate through the cellular RF transceiver 922 with other wireless devices, such as a UE 104 and/or base station 102/180. The one or more cellular baseband processors 904 may each include a computer-readable medium/one or more memories. The computer-readable medium/one or more memories may be non-transitory. The one or more cellular baseband processors 904 are responsible for general processing, including the execution of software stored on the computer-readable medium/one or more memories individually or in combination. The software, when executed by the one or more cellular baseband processors 904, causes the one or more cellular baseband processors 904 to, individually or in combination, perform the various functions described supra. The computer-readable medium/one or more memories may also be used individually or in combination for storing data that is manipulated by the one or more cellular baseband processors 904 when executing software. The one or more cellular baseband processors 904 individually or in combination further include a reception component 930, a communication manager 932, and a transmission component 934. The communication manager 932 includes the one or more illustrated components. The components within the communication manager 932 may be stored in the computer-readable medium/one or more memories and/or configured as hardware within the one or more cellular baseband processors 904. The one or more cellular baseband processors 904 may be components of the UE 350 and may individually or in combination include the one or more memories 360 and/or at least one of the one or more TX processors 368, at least one of the one or more RX processors 356, and at least one of the one or more controllers/processors 359. In one configuration, the apparatus 902 may be a modem chip and include just the one or more baseband processors 904, and in another configuration, the apparatus 902 may be the entire wireless device (e.g., see the UE 104 of FIG. 1) and include the additional modules of the apparatus 902.

The reception component 930 may be configured to receive, demodulate and decode signals and provide the demodulated and decoded signals to the communication manager 932, where the reception, demodulation and decoding may be performed by at least one of the one or more RX Processors 356 and the one or more controllers/processors 359 such as described in connection with FIG. 3. The transmission component 934 may be configured to obtain data such as reports from the communication manager 932 and encode, modulate, and transmit the data to a network entity, where the coding, modulation, and transmission may be performed by at least one of the one or more TX Processors 368 and the one or more controllers/processors 359 such as described in connection with FIG. 3.

The communication manager 932 includes a measurement component 940, a determination component 942 and/or a report component 944 configured to perform the aspects described in connection with the process in FIG. 7.

For instance, the measurement component 940 may be configured to obtain a plurality of interference measurements of one or more first reference signals, where the plurality of interference measurements includes a measurement obtained prior to and after a backoff adaptation associated with a first network entity, such as described in connection with block 710. For example, to obtain the interference measurements, the measurement component 940 may, both prior to and after the backoff adaptation, obtain a first reference signal from reception component 930 (which had received, demodulated and decoded the reference signal from a second network entity), and estimate the received signal quality of the reference signal. The measurement component 940 may also be configured to obtain one or more signal strength measurements of a second reference signal received from the first network entity, such as described in connection with block 720. For example, to obtain a signal strength measurement, the measurement component 940 may receive the second reference signal such as an SSB or CSI-RS from reception component 930 (after the signal is demodulated and decoded), and calculate the received power of the reference signal.

The determination component 942 may be configured to determine whether a difference between the plurality of interference measurements exceeds an interference threshold value and whether the signal strength measurement exceeds a signal strength threshold value. The determination component 942 may also be configured to determine whether a variance among additional interference measurements between a first time slot and a second time slot within a time window after a time instance of the backoff adaptation is less than a variance threshold value. The determination component 942 may also be configured to determine whether a total physical resource block usage of a shared resource allocation between the first network entity and one or more additional network entities in one or more neighbor cells is less than a resource usage threshold value.

The report component 944 may be configured to send, to a second network entity of a serving cell, an interference report indicating whether downlink interference originates from the first network entity based at least in part on the plurality of interference measurements and the one or more signal strength measurements, such as described in connection with block 730. For example, the report component 944 may provide the interference report to the transmission component 944, which in turn may encode, modulate, and transmit the interference report to the second network entity.

The apparatus is illustrated as including components to perform the process of FIG. 7, because the wireless device may operate as a transmitting device at times and may operate as a receiving device at other times.

The apparatus 902 may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by one or more processors individually or in combination configured to perform the stated processes/algorithm, stored within a computer-readable medium for implementation by one or more processors, or some combination thereof.

In one configuration, the apparatus 902, and in particular the one or more cellular baseband processors 904, may include means for obtaining a plurality of interference measurements of one or more first reference signals, the plurality of interference measurements including a measurement obtained prior to and after a backoff adaptation associated with a first network entity. The apparatus 902 also includes means for obtaining one or more signal strength measurements of a second reference signal received from the first network entity. The apparatus 902 also includes means for sending, to a second network entity of a serving cell, an interference report indicating whether downlink interference originates from the first network entity based at least in part on the plurality of interference measurements and the one or more signal strength measurements.

The aforementioned means may be one or more of the aforementioned components of the apparatus 902 configured to perform the functions recited by the aforementioned means. As described supra, the apparatus 902 may include the one or more TX Processors 368, the one or more RX Processors 356, and the one or more controllers/processors 359. As such, in one configuration, the aforementioned means may be at least one of the one or more TX Processors 368, at least one of the one or more RX Processors 356, or at least one of the one or more controllers/processors 359, individually or in any combination configured to perform the functions recited by the aforementioned means.

Figure 10:
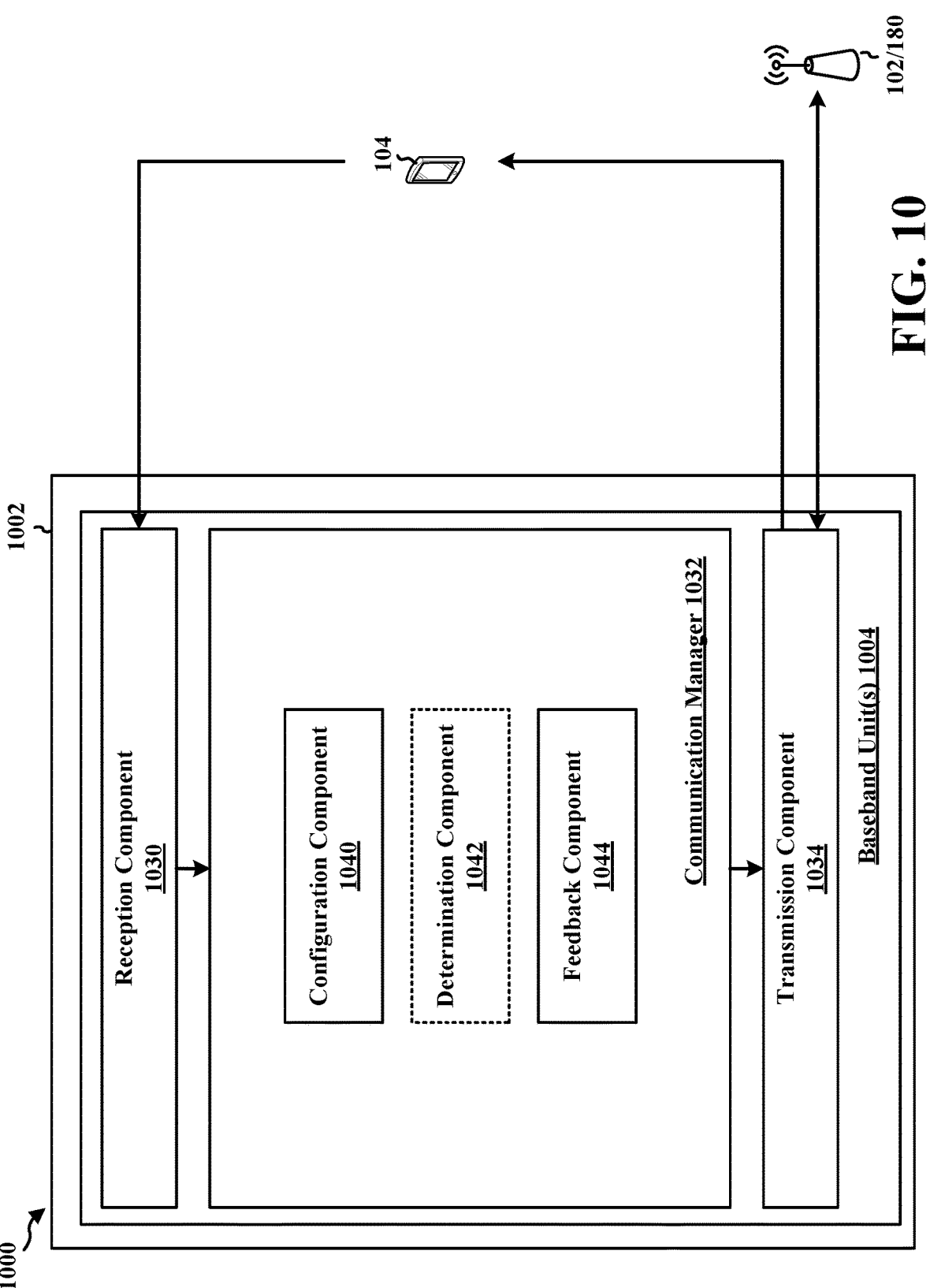
FIG. 10 is a diagram illustrating an example of a hardware implementation for an example apparatus, according to some implementations of the present disclosure.

FIG. 10 is a diagram 1000 illustrating an example of a hardware implementation for an apparatus 1002. The apparatus 1002 may be a base station or other wireless device or network entity that communicates based on downlink/uplink. The apparatus 1002 includes one or more baseband units 1004. The one or more baseband units 1004 communicate through a cellular RF transceiver with other wireless devices, such as a UE 104. The one or more baseband units 1004 may each include a computer-readable medium/one or more memories. The computer-readable medium/one or more memories may be non-transitory. The one or more baseband units 1004 are responsible for general processing, including the execution of software stored on the computer-readable medium/one or more memories individually or in combination. The software, when executed by the one or more baseband units 1004, causes the one or more baseband units 1004 to, individually or in combination, perform the various functions described supra. The computer-readable medium/one or more memories may also be used individually or in combination for storing data that is manipulated by the one or more baseband units 1004 when executing software. The one or more baseband units 1004 individually or in combination further include a reception component 1030, a communication manager 1032, and a transmission component 1034. The communication manager 1032 includes the one or more illustrated components. The components within the communication manager 1032 may be stored in the computer-readable medium/one or more memories and/or configured as hardware within the one or more baseband units 1004. The one or more baseband units 1004 may be components of the base station 102/180 and may individually or in combination include the one or more memories 376 and/or at least one of the one or more TX processors 316, at least one of the one or more RX processors 370, and at least one of the one or more controllers/processors 375. In one configuration, the apparatus 1002 may be a modem chip and include just the one or more baseband units 1004, and in another configuration, the apparatus 1002 may be the entire wireless device (e.g., see the base station 102/180 of FIG. 3) and include the additional modules of the apparatus 1002.

The reception component 1030 may be configured to receive, demodulate and decode data such as reports and provide the demodulated and decoded data to the communication manager 1032, where the reception, demodulation and decoding may be performed by at least one of the one or more RX Processors 370 and the one or more controller/processors 375 such as described in connection with FIG. 3. The transmission component 1034 may be configured to obtain signals from the communication manager 1032 and encode, modulate, and transmit the signals to another network entity, where the coding, modulation, and transmission may be performed by at least one of the one or more TX Processors 316 and the one or more controller/processors 375 such as described in connection with FIG. 3.

The communication manager 1032 includes a configuration component 1040, a determination component 1042 and/or a feedback component 1044 configured to perform the aspects described in connection with the process in FIG. 8.

For instance, the configuration component 1040 may be configured to obtain, from a UE, an interference report indicating whether downlink interference to the UE originates from a second network entity based at least in part on a plurality of interference measurements of one or more first reference signals and one or more signal strength measurements of a second reference signal, the plurality of interference measurements including a measurement obtained prior to and after a backoff adaptation associated with the second network entity, and the second reference signal being associated with the second network entity, such as described in connection with block 810. For example, the configuration component 1040 may obtain the interference report from reception component 1030 as a result of the reception component 1030 receiving, demodulating and decoding a signal from a UE carrying the interference report and providing the report to the configuration component 1040.

The determination component 1042 may be configured to determine whether a difference between the plurality of interference measurements exceeds an interference threshold value and whether the signal strength measurement exceeds a signal strength threshold value. The determination component 1042 may also be configured to determine whether a variance among additional interference measurements between a first time slot and a second time slot within a time window after a time instance of the backoff adaptation is less than a variance threshold value. The determination component 1042 may also be configured to determine whether a total physical resource block usage of a shared resource allocation between the second network entity and one or more additional network entities in one or more neighbor cells is less than a resource usage threshold value.

The feedback component 1044 may be configured to send, to the second network entity, a feedback signal indicating whether the second network entity is to modify the backoff adaptation based on the downlink interference to the UE, such as described in connection with block 820. For example, the feedback component 1044 may provide the feedback signal to the transmission component 1044, which in turn may encode, modulate, and transmit the feedback signal to the second network entity.

The apparatus is illustrated as including components to perform the process in FIG. 8, because the wireless device may operate as a transmitting device at times and may operate as a receiving device at other times. In other examples, the apparatus 1002 may include components for the process of FIG. 8.

The apparatus 1002 may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by one or more processors individually or in combination configured to perform the stated processes/algorithm, stored within a computer-readable medium for implementation by one or more processors, or some combination thereof.

In one configuration, the apparatus 1002, and in particular the one or more baseband units 1004, may further include means for obtaining, from a UE, an interference report indicating whether downlink interference to the UE originates from a second network entity based at least in part on a plurality of interference measurements of one or more first reference signals and one or more signal strength measurements of a second reference signal, the plurality of interference measurements including a measurement obtained prior to and after a backoff adaptation associated with the second network entity, and the second reference signal being associated with the second network entity. The apparatus 1002 also includes means for sending, to the second network entity, a feedback signal indicating whether the second network entity is to modify the backoff adaptation based on the downlink interference to the UE.

The aforementioned means may be one or more of the aforementioned components of the apparatus 1802 configured to perform the functions recited by the aforementioned means. As described supra, the apparatus 1802 may include the one or more TX Processors 316, the one or more RX Processors 370, and the one or more controllers/processors 375. As such, in one configuration, the aforementioned means may be at least one of the one or more TX Processors 316, at least one of the one or more RX Processors 356, or at least one of the one or more controllers/processors 359, individually or in any combination configured to perform the functions recited by the aforementioned means.

The following aspects are illustrative only and may be combined with aspects of other embodiments or teachings described herein, without limitation.

Aspect 1 is a method of wireless communication performed by a user equipment that includes obtaining a plurality of interference measurements of one or more first reference signals, the plurality of interference measurements including a measurement obtained prior to and after a backoff adaptation associated with a first network entity; obtaining one or more signal strength measurements of a second reference signal received from the first network entity; and sending, to a second network entity of a serving cell, an interference report indicating whether downlink interference originates from the first network entity based at least in part on the plurality of interference measurements and the one or more signal strength measurements.

In Aspect 2, the method of Aspect 1 further includes that the interference report further indicates whether there is an increase in the downlink interference in one or more subbands after the backoff adaptation associated with the first network entity.

In Aspect 3, the method of any of Aspects 1 or 2 further includes that the plurality of interference measurements includes one or more first interference measurements obtained prior to the backoff adaptation and one or more second interference measurements obtained after the backoff adaptation, the one or more first interference measurements and the one or more second interference measurements being associated with same reference signal resources.

In Aspect 4, the method of Aspect 3 further includes that the interference report indicates whether a difference between the one or more second interference measurements and the one or more first interference measurements exceeds an interference threshold value.

In Aspect 5, the method of any of Aspects 1-4 further includes that the one or more first reference signals are associated with zero power channel state information reference signal (ZP CSI-RS) resources or non-zero power CSI-RS (NZP CSI-RS) resources.

In Aspect 6, the method of any of Aspects 1-5 further includes that the one or more signal strength measurements of the second reference signal include a received signal received power (RSRP) measurement of the second reference signal, and the interference report indicates whether the RSRP measurement exceeds a signal strength threshold value.

In Aspect 7, the method of Aspect 6 further includes that the second reference signal is a synchronization signal block (SSB) or a channel state information reference signal (CSI-RS).

In Aspect 8, the method of Aspect 7 further includes determining whether the RSRP measurement exceeds the signal strength threshold value over a specified period of time, the specified period of time being a period starting a first number of slots prior to a time instance of the backoff adaptation and ending up to a second number of slots after the time instance of the backoff adaptation.

In Aspect 9, the method of any of Aspects 1-8 further includes obtaining a plurality of additional interference measurements of additional reference signals at respective time slots within a time window after a time instance of the backoff adaptation, and the interference report indicates whether a variance among the plurality of additional interference measurements between a first time slot and a second time slot within the time window is less than a variance threshold value.

In Aspect 10, the method of any of Aspects 1-9 further includes that the downlink interference corresponds to operating band unwanted emissions (OBUE).

In Aspect 11, the method of Aspect 10 further includes that the plurality of interference measurements of the one or more first reference signals are obtained in one or more subbands associated with a same cell as the first network entity.

In Aspect 12, the method of Aspect 10 further includes that the plurality of interference measurements of the one or more first reference signals are obtained in one or more subbands associated with a different cell than the first network entity.

In Aspect 13, the method of any of Aspects 1-12 further includes receiving a downlink configuration configuring the UE to perform the plurality of interference measurements of the one or more first reference signals and to send the interference report including the plurality of interference measurements.

In Aspect 14, the method of any of Aspects 1-12 further includes receiving a downlink configuration configuring the UE to perform the plurality of interference measurements of the one or more first reference signals and to send the interference report including respective threshold comparison results for the plurality of interference measurements and the one or more signal strength measurements.

In Aspect 15, the method of Aspect 14 further includes that the downlink configuration configures the UE with a time instant value indicating when the backoff adaptation occurs in the first network entity.

In Aspect 16, the method of Aspect 14 further includes that the downlink configuration configures the UE with a time window for interference measurement spanning from a first time prior to a time instance of the backoff adaptation until a second time after the time instance of the backoff adaptation.

In Aspect 17, the method of Aspect 14 further includes that the downlink configuration configures the UE with a plurality of threshold values for comparisons with the plurality of interference measurements and the one or more signal strength measurements.

In Aspect 18, the method of any of Aspects 1-17 further includes that one or more additional network entities in one or more neighbor cells of the second network entity share a resource allocation with the first network entity, and the interference report indicates whether a total physical resource block usage of the resource allocation is less than a resource usage threshold value.

Aspect 19 is an apparatus including one or more processors and one or more memories in electronic communication with the one or more processors storing instructions executable by the one or more processors to cause the apparatus to implement a method as in any of Aspects 1-18.

Aspect 20 is a non-transitory computer readable medium storing instructions executable by one or more processors to cause the one or more processors to implement a method as in any of Aspects 1-18.

Aspect 21 is a method of wireless communication performed by a first network entity that includes obtaining, from a user equipment (UE), an interference report indicating whether downlink interference to the UE originates from a network entity based at least in part on a plurality of interference measurements of one or more first reference signals and one or more signal strength measurements of a second reference signal, the plurality of interference measurements including a measurement obtained prior to and after a backoff adaptation associated with the network entity, and the second reference signal being associated with the network entity; and sending, to the network entity, a feedback signal indicating whether the network entity is to modify the backoff adaptation based on the downlink interference to the UE.

In Aspect 22, the method of Aspect 21 further includes that one or more additional network entities in one or more neighbor cells of the apparatus share a resource allocation with the network entity, and determining whether a total physical resource block usage of the resource allocation is less than a resource usage threshold value.

In Aspect 23, the method of any of Aspects 21 or 22 further includes that the interference report further indicates whether there is an increase in the downlink interference in one or more subbands after the backoff adaptation associated with the network entity.

In Aspect 24, the method of any of Aspects 21-23 further includes that the plurality of interference measurements include one or more first interference measurements occurring prior to the backoff adaptation and one or more second interference measurements occurring after the backoff adaptation in association with same reference signal resources.

In Aspect 25, the method of Aspect 24 further includes that the interference report indicates whether a difference between the one or more second interference measurements and the one or more first interference measurements exceeds an interference threshold value.

In Aspect 26, the method of any of Aspects 21-25 further includes that the one or more first reference signals are associated with zero power channel state information reference signal (ZP CSI-RS) resources or non-zero power CSI-RS (NZP CSI-RS) resources.

In Aspect 27, the method of any of Aspects 21-26 further includes that the one or more signal strength measurements of the second reference signal include a received signal received power (RSRP) measurement of the second reference signal, and the interference report further indicates whether the RSRP measurement exceeds a signal strength threshold value.

In Aspect 28, the method of Aspect 27 further includes determining whether the RSRP measurement exceeds the signal strength threshold value over a specified period of time, the specified period of time being a period starting a first number of slots prior to a time instance of the backoff adaptation and ending up to a second number of slots after the time instance of the backoff adaptation.

In Aspect 29, the method of any of Aspects 21-28 further includes that the interference report indicates whether a variance among a plurality of additional interference measurements of additional reference signals transmitted between a first time slot and a second time slot within a time window after a time instance of the backoff adaptation is less than a variance threshold value.

In Aspect 30, the method of any of Aspects 21-29 further includes that the downlink interference corresponds to operating band unwanted emissions (OBUE).

In Aspect 31, the method of any of Aspects 21-30 further includes transmitting, to the UE, a downlink configuration configuring the UE to perform the plurality of interference measurements of the one or more first reference signals and to send the interference report including the plurality of interference measurements.

In Aspect 32, the method of any of Aspects 21-31 further includes transmitting, to the UE, a downlink configuration configuring the UE to perform the plurality of interference measurements of the one or more first reference signals and to send the interference report including respective threshold comparison results for the plurality of interference measurements and the one or more signal strength measurements.

In Aspect 33, the method of Aspect 32 further includes that the downlink configuration configures the UE with a time instant value indicating when the backoff adaptation occurs in the network entity.

In Aspect 34, the method of Aspect 32 further includes that the downlink configuration configures the UE with a time window for interference measurement spanning from a first time prior to a time instance of the backoff adaptation until a second time after the time instance of the backoff adaptation.

In Aspect 35, the method of Aspect 32 further includes that the downlink configuration configures the UE with a plurality of threshold values for comparisons with the plurality of interference measurements and the one or more signal strength measurements.

Aspect 36 is an apparatus including one or more processors and one or more memories in electronic communication with the one or more processors storing instructions executable by the one or more processors to cause the apparatus to implement a method as in any of Aspects 21-35.

Aspect 37 is a system or apparatus including means for implementing a method or realizing an apparatus as in any of Aspects 21-35.

Aspect 38 is a non-transitory computer readable medium storing instructions executable by one or more processors to cause the one or more processors to implement a method as in any of Aspects 21-35.

Aspect 39 is a system or apparatus including means for implementing a method or realizing an apparatus as in any of Aspects 1-18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, a processor, at least one processor, and/or one or more processors, individually or in combination, configured to perform or operable for performing a plurality of actions (such as the functions described supra) is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

Similarly as used herein, a memory, at least one memory, a computer-readable medium, and/or one or more memories, individually or in combination, configured to store or having stored thereon instructions executable by one or more processors for performing a plurality of actions (such as the functions described supra) is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, a computer-readable medium, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, a second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processors may in combination execute the respective subset of instruction to accomplish performing actions X, Y, and Z. Alternatively, a single processor may execute the instructions stored on a single memory, or distributed across multiple memories, to accomplish performing actions X, Y, and Z.

What is claimed is:

1. An apparatus for wireless communication, comprising:
one or more memories; and
one or more processors each communicatively coupled with at least one of the one or more memories, the one or more processors, individually or in any combination, operable to cause the apparatus to:
obtain a plurality of interference measurements of one or more first reference signals, the plurality of interference measurements including a measurement obtained prior to and after a backoff adaptation associated with a first network entity;
obtain one or more signal strength measurements of a second reference signal received from the first network entity; and
send, to a second network entity of a serving cell, an interference report indicating whether downlink interference originates from the first network entity based at least in part on the plurality of interference measurements and the one or more signal strength measurements.

2. The apparatus of claim 1, wherein the interference report further indicates whether there is an increase in the downlink interference in one or more subbands after the backoff adaptation associated with the first network entity.

3. The apparatus of claim 1, wherein the plurality of interference measurements includes one or more first interference measurements obtained prior to the backoff adaptation and one or more second interference measurements obtained after the backoff adaptation, the one or more first interference measurements and the one or more second interference measurements being associated with same reference signal resources.

4. The apparatus of claim 3, wherein the interference report indicates whether a difference between the one or more second interference measurements and the one or more first interference measurements exceeds an interference threshold value.

5. The apparatus of claim 1, wherein the one or more first reference signals are associated with zero power channel state information reference signal (ZP CSI-RS) resources or non-zero power CSI-RS (NZP CSI-RS) resources.

6. The apparatus of claim 1, wherein the one or more signal strength measurements of the second reference signal include a received signal received power (RSRP) measurement of the second reference signal, and the interference report indicates whether the RSRP measurement exceeds a signal strength threshold value.

7. The apparatus of claim 6, wherein the second reference signal is a synchronization signal block (SSB) or a channel state information reference signal (CSI-RS).

8. The apparatus of claim 7, wherein the one or more processors, individually or in any combination, are further operable to cause the apparatus to determine whether the RSRP measurement exceeds the signal strength threshold value over a specified period of time, the specified period of time being a period starting a first number of slots prior to a time instance of the backoff adaptation and ending up to a second number of slots after the time instance of the backoff adaptation.

9. The apparatus of claim 1, wherein the one or more processors, individually or in any combination, are further operable to cause the apparatus to obtain a plurality of additional interference measurements of additional reference signals at respective time slots within a time window after a time instance of the backoff adaptation, and the interference report indicates whether a variance among the plurality of additional interference measurements between a first time slot and a second time slot within the time window is less than a variance threshold value.

10. The apparatus of claim 1, wherein the downlink interference corresponds to operating band unwanted emissions (OBUE).

11. The apparatus of claim 10, wherein the plurality of interference measurements of the one or more first reference signals are obtained in one or more subbands associated with a same cell as the first network entity.

12. The apparatus of claim 10, wherein the plurality of interference measurements of the one or more first reference signals are obtained in one or more subbands associated with a different cell than the first network entity.

13. The apparatus of claim 1, wherein the one or more processors, individually or in any combination, are further operable to cause the apparatus to receive a downlink configuration configuring the apparatus to perform the plurality of interference measurements of the one or more first reference signals and to send the interference report including the plurality of interference measurements.

14. The apparatus of claim 1, wherein the one or more processors, individually or in any combination, are further operable to cause the apparatus to receive a downlink configuration configuring the apparatus to perform the plurality of interference measurements of the one or more first reference signals and to send the interference report including respective threshold comparison results for the plurality of interference measurements and the one or more signal strength measurements.

15. The apparatus of claim 14, wherein the downlink configuration configures the apparatus with a time instant value indicating when the backoff adaptation occurs in the first network entity.

16. The apparatus of claim 14, wherein the downlink configuration configures the apparatus with a time window for interference measurement spanning from a first time prior to a time instance of the backoff adaptation until a second time after the time instance of the backoff adaptation.

17. The apparatus of claim 14, wherein the downlink configuration configures the apparatus with a plurality of threshold values for comparisons with the plurality of interference measurements and the one or more signal strength measurements.

18. The apparatus of claim 1, wherein one or more additional network entities in one or more neighbor cells of the second network entity share a resource allocation with the first network entity, and the interference report indicates whether a total physical resource block usage of the resource allocation is less than a resource usage threshold value.

19. A method of wireless communication performable by a user equipment (UE), the method comprising:

obtaining a plurality of interference measurements of one or more first reference signals, the plurality of interference measurements including a measurement obtained prior to and after a backoff adaptation associated with a first network entity;

obtaining one or more signal strength measurements of a second reference signal received from the first network entity; and sending, to a second network entity of a serving cell, an interference report indicating whether downlink interference originates from the first network entity based at least in part on the plurality of interference measurements and the one or more signal strength measurements.

20. An apparatus for wireless communication, comprising:

one or more memories; and one or more processors each communicatively coupled with at least one of the one or more memories, the one or more processors, individually or in any combination, operable to cause the apparatus to:

obtain, from a user equipment (UE), an interference report indicating whether downlink interference to the UE originates from a network entity based at least in part on a plurality of interference measurements of one or more first reference signals and one or more signal strength measurements of a second reference signal, the plurality of interference measurements including a measurement obtained prior to and after a backoff adaptation associated with the network entity, and the second reference signal being associated with the network entity; and send, to the network entity, a feedback signal indicating whether the network entity is to modify the backoff adaptation based on the downlink interference to the UE.

21. The apparatus of claim 20, wherein one or more additional network entities in one or more neighbor cells of the apparatus share a resource allocation with the network entity, and the at least one processor is further configured to determine whether a total physical resource block usage of the resource allocation is less than a resource usage threshold value.

22. The apparatus of claim 20, wherein the interference report further indicates whether there is an increase in the downlink interference in one or more subbands after the backoff adaptation associated with the network entity.

23. The apparatus of claim 20, wherein the plurality of interference measurements include one or more first interference measurements occurring prior to the backoff adaptation and one or more second interference measurements occurring after the backoff adaptation in association with same reference signal resources.

24. The apparatus of claim 23, wherein the interference report indicates whether a difference between the one or more second interference measurements and the one or more first interference measurements exceeds an interference threshold value.

25. The apparatus of claim 20, wherein the one or more signal strength measurements of the second reference signal include a received signal received power (RSRP) measurement of the second reference signal, and the interference report further indicates whether the RSRP measurement exceeds a signal strength threshold value.

26. The apparatus of claim 25, wherein the one or more processors, individually or in any combination, are further operable to cause the apparatus to determine whether the RSRP measurement exceeds the signal strength threshold value over a specified period of time, the specified period of time being a period starting a first number of slots prior to a time instance of the backoff adaptation and ending up to a second number of slots after the time instance of the backoff adaptation.

27. The apparatus of claim 20, wherein the interference report indicates whether a variance among a plurality of additional interference measurements of additional reference signals transmitted between a first time slot and a second time slot within a time window after a time instance of the backoff adaptation is less than a variance threshold value.

28. The apparatus of claim 20, wherein the one or more processors, individually or in any combination, are further operable to cause the apparatus to transmit, to the UE, a downlink configuration configuring the UE to perform the plurality of interference measurements of the one or more first reference signals and to send the interference report including at least one of the plurality of interference measurements, or, respective threshold comparison results for the plurality of interference measurements and the one or more signal strength measurements.

29. The apparatus of claim 28, wherein the downlink configuration configures the UE with at least one of: a time instant value indicating when the backoff adaptation occurs in the network entity, a time window for interference measurement spanning from a first time prior to a time instance of the backoff adaptation until a second time after the time instance of the backoff adaptation, or a plurality of threshold values for comparisons with the plurality of interference measurements and the one or more signal strength measurements.

30. A method of wireless communication performable by a first network entity, the method comprising:

obtaining, from a user equipment (UE), an interference report indicating whether downlink interference to the UE originates from a second network entity based at least in part on a plurality of interference measurement of one or more first reference signals and one or more signal strength measurements of a second reference signal, the plurality of interference measurements including a measurement obtained prior to and after a backoff adaptation associated with the second network entity, and the second reference signal being associated with the second network entity; and sending, to the second network entity, a feedback signal indicating whether the second network entity is to modify the backoff adaptation based on the downlink interference to the UE.

\* \* \* \* \*